United States Patent [19]
Jenkins et al.

[11] Patent Number: 5,487,556
[45] Date of Patent: Jan. 30, 1996

[54] AIR BAG MODULE

[75] Inventors: Jeffrey A. Jenkins, Shelby Township; John W. Wiers, Romeo, both of Mich.

[73] Assignee: TRW Vehicle Safety Systems Inc., Lyndhurst, Ohio

[21] Appl. No.: 308,364

[22] Filed: Sep. 19, 1994

[51] Int. Cl.[6] .................................................. B60R 21/16
[52] U.S. Cl. .................. 280/728.2; 280/736; 411/353; 403/327
[58] Field of Search .............................. 280/728 A, 732, 280/740, 741, 728.1, 728.2; 403/327; 411/353, 352, 936, 119, 120, 126, 127, 149, 150

[56] References Cited

U.S. PATENT DOCUMENTS

| | | |
|---|---|---|
| 3,887,109 | 6/1975 | Libkie . |
| 4,153,273 | 5/1979 | Risko ........................................ 280/732 |
| 4,158,696 | 6/1979 | Wilhelm ................................... 422/166 |
| 4,915,410 | 4/1990 | Bachelder . |
| 4,919,897 | 4/1990 | Bender et al. ........................... 280/736 |
| 5,062,664 | 11/1991 | Bishop et al. . |
| 5,195,860 | 3/1993 | Steyn ........................................ 411/353 |
| 5,234,227 | 8/1993 | Webber . |
| 5,328,203 | 7/1994 | Baba et al. ............................... 280/732 |
| 5,342,084 | 8/1994 | Rose et al. ............................ 280/728 A |
| 5,356,175 | 10/1994 | Rose et al. ............................ 280/728 A |

FOREIGN PATENT DOCUMENTS 2157786  10/1985  United Kingdom ................... 411/353

OTHER PUBLICATIONS

SPEC, Stock Springs, Spring Washers and Retaining Rings catalog, pp. 1–3.
Waldes Truarc Retaining Rings Technical Manual, Jan. 1981 p. 5 (classified in 411/353).

Primary Examiner—Karin L. Tyson
Attorney, Agent, or Firm—Tarolli, Sundheim & Covell

[57] ABSTRACT

An air bag module (10) includes a housing (12), an air bag (14), and an inflator (16). A pair of wave springs (20, 22) are mounted on opposite end walls (40, 42) of the housing (12). The springs (20, 22) engage opposite end portions (132, 134) of the inflator (16) to secure the inflator to the housing (12). The inflator (16) extends through a cardboard plenum tube (18) in the housing (12). The plenum tube (18) keeps open a passage in the air bag (14) for insertion of the inflator (16) during assembly of the module (10).

18 Claims, 3 Drawing Sheets

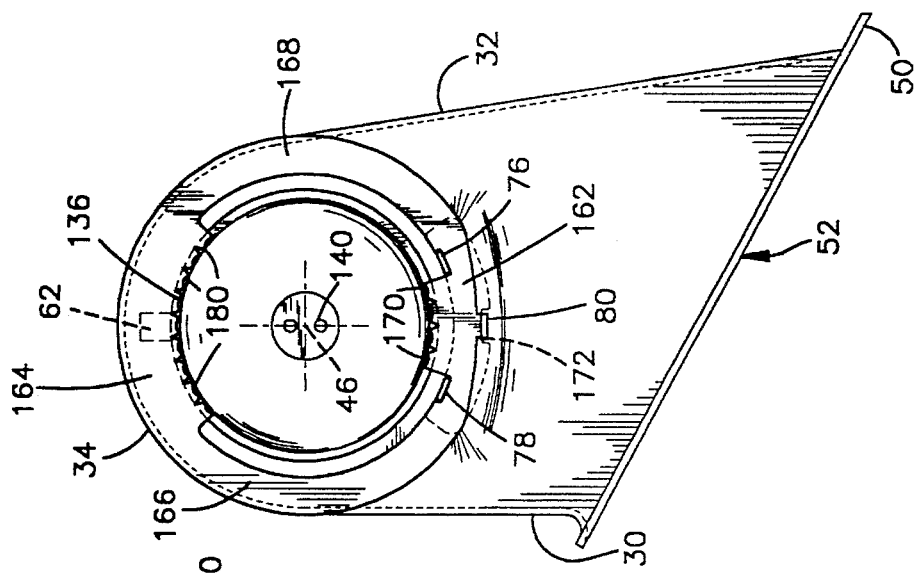
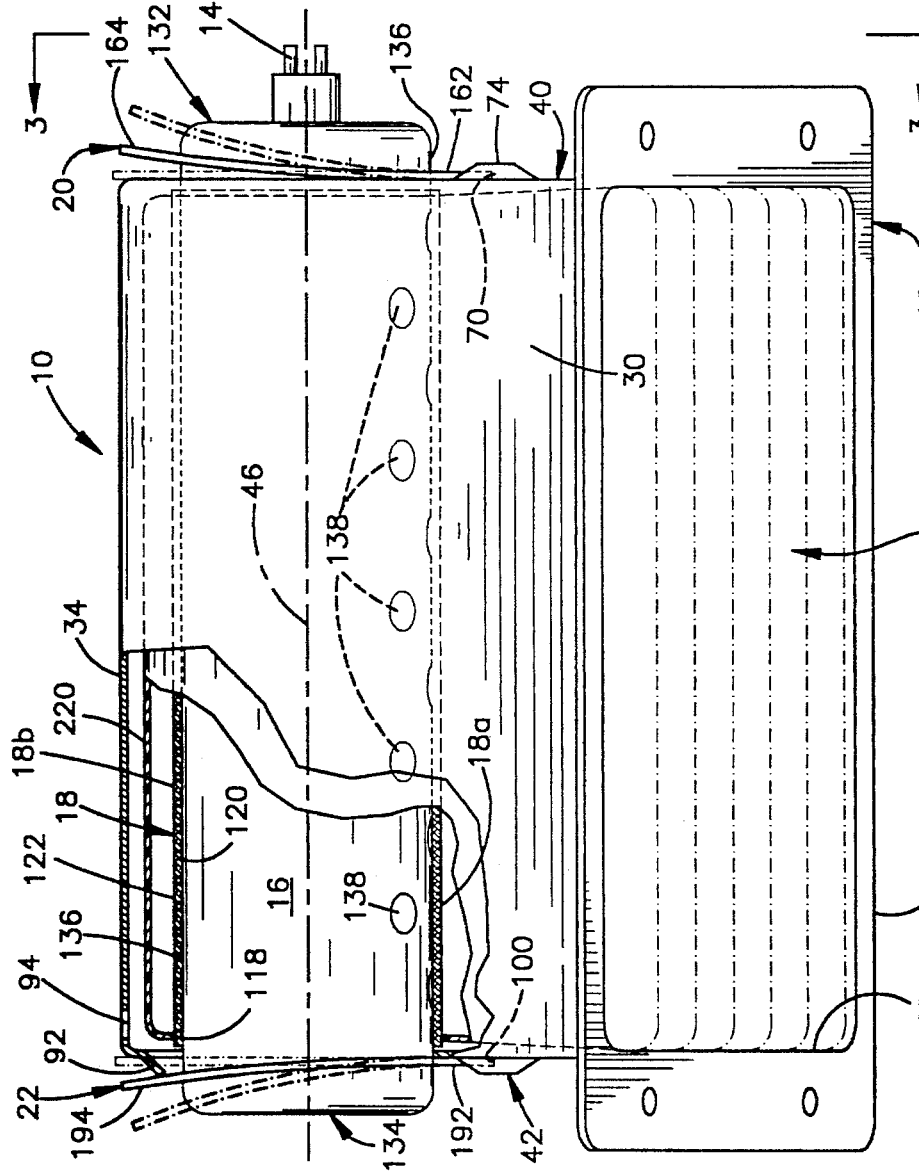

AIR BAG MODULE

BACKGROUND OF THE INVENTION

1. Technical Field

The present invention relates to a vehicle occupant safety apparatus, and particularly relates to an air bag module in which an inflator and an air bag are secured in a housing.

2. Description of the Prior Art

A typical air bag module includes an air bag, an inflator for inflating the air bag, and a housing in which the air bag and the inflator are disposed. The inflator is connected with the housing by a threaded mounting stud located at one end of the inflator. The air bag is connected with the housing by a retaining ring which is sewn into the air bag and which is fastened to the housing by screws or rivets. The housing is connected with a portion of the vehicle, such as the vehicle instrument panel, and supports the air bag and the inflator in the vehicle. In the event of a vehicle collision, the inflator is actuated to direct inflation fluid into the air bag. The air bag inflates into a position to restrain the vehicle occupant from forcefully striking parts of the vehicle.

SUMMARY OF THE INVENTION

The present invention is a vehicle safety apparatus comprising a housing and an inflatable vehicle occupant restraint connected with the housing. An inflation fluid source is disposed in the housing for supplying inflation fluid to the inflatable restraint. A first end portion of the inflation fluid source projects from the housing. A spring member is connected with the housing and has an annular configuration defining a central opening in the spring member. The first end portion of the inflation fluid source extends through the central opening in the spring member. The spring member has a portion movable relative to the inflation fluid source between a first condition in which the first end portion of the inflation fluid source is movable through the central opening of the spring member and a second condition in which the first end portion of the inflation fluid source is not movable through the central opening of the spring member. In a preferred embodiment, the vehicle safety apparatus includes plenum means for maintaining a chamber in the inflatable restraint through which the inflation fluid source is extensible during assembly of the inflation fluid source into the housing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a top plan view, partially in section, showing the vehicle safety apparatus of FIG. 1 in an assembled condition;

FIG. 3 is an end view of the vehicle safety apparatus of FIG. 2 taken along line 3—3 of FIG. 2;

DESCRIPTION OF A PREFERRED EMBODIMENT

Figure 1:
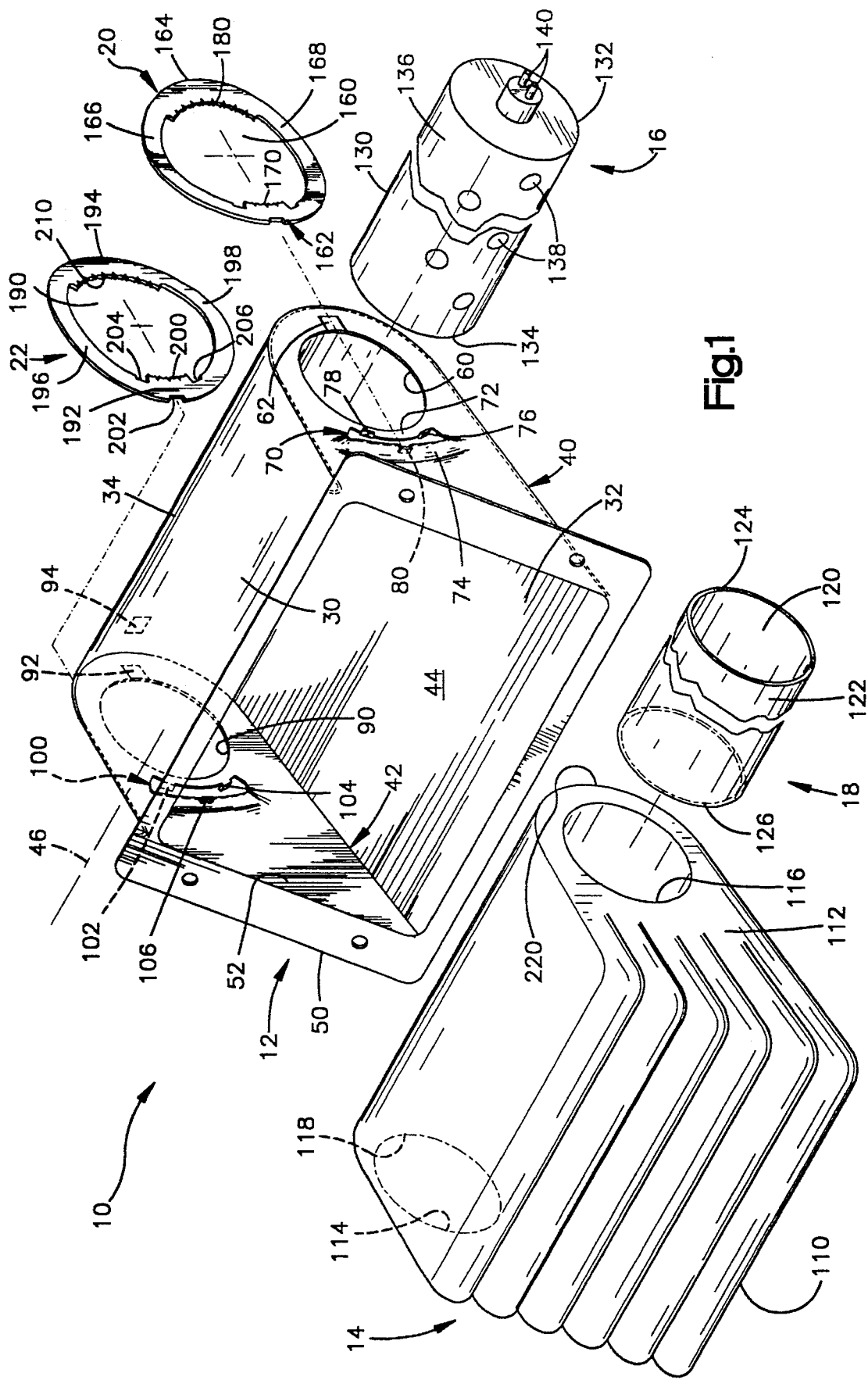
FIG. 1 is an exploded perspective view of a vehicle safety apparatus embodying the present invention.

The present invention relates to a vehicle safety apparatus and particularly relates to a vehicle safety apparatus including an inflatable vehicle occupant restraint which is inflated to protect an occupant of a vehicle in the event of a vehicle collision. The present invention is applicable to various vehicle safety apparatus constructions. As representative of the present invention, FIG. 1 illustrates a vehicle safety apparatus comprising an air bag module 10.

The module 10 includes a housing 12 and an air bag 14. The module 10 also includes an inflation fluid source or inflator 16, a plenum tube 18, and a pair of spring members 20 and 22.

The housing 12 is made of sheet metal and includes a generally planar upper wall 30 and a generally planar lower wall 32 spaced from and extending at an angle to the upper wall 30. The inner side surface of the lower wall 32 faces the inner side surface of the upper wall 30. The housing 12 further includes a curved central wall 34 extending between and interconnecting the upper wall 30 and the lower wall 32 to form a C-shaped cross-sectional configuration for the housing 12.

Opposed parallel first and second end walls 40 and 42 of the housing 12 extend perpendicular to the upper and lower walls 30 and 32 at opposite ends of the C-shaped configuration. Each end wall 40 and 42 has a generally planar configuration. The housing walls 30, 32, 34, 40 and 42 define a chamber 44 in the housing 12. An axis 46 of the module 10 extends longitudinally between the end walls 40 and 42. In the illustrated embodiment, the axis 46 is disposed parallel to the upper and lower walls 30 and 32 of the housing 12.

The housing 12 includes a flange 50 for securing the housing to a portion of the vehicle, such as the instrument panel, in any known manner. The flange 50 defines an opening 52 into the housing 12 opposite the central wall 34. A pair of ribs (not shown) on the lower wall 32 receive fasteners (not shown) for fastening the housing 12 to a structural portion of the vehicle such as a cross-member extending behind the instrument panel.

A circular opening 60 is formed in the first end wall 40 of the housing 12. The opening 60 is centered on the axis 46. A pair of narrow slits which extend outward from the periphery of the opening 60 define between them a safety tab 62 in the first end wall 40. The safety tab 62 is disposed at a location adjacent to the central wall 34 of the housing 12.

A slot 70 is formed in the first end wall 40 at a location intermediate the circular opening 60 and the instrument panel mounting flange 50. The slot 70 is formed by cutting away an arcuate segment of the material of the first end wall 40. A connector portion 72 and a mounting portion 74 of the first end wall 40 are thereby formed on opposite inner and outer peripheral sides of the slot 70.

A pair of inner mounting tabs 76 and 78 project from the connector portion 72 of the first end wall 40 in a direction away from the chamber 44 and perpendicular to the plane of the first end wall. The inner mounting tabs 76 and 78 are disposed near the circumferential ends of the slot 70.

The mounting portion 74 of the first end wall 40 is deformed axially outward from the plane of the first end wall 40 and extends generally parallel to the plane of the first end wall. An outer mounting tab 80 projects from the mounting portion 74 in a direction toward the chamber 44 and parallel to the inner mounting tabs 76 and 78. The outer mounting tab 80 is disposed at the circumferential center of the slot 70.

The second end wall 42 of the housing 12 is a mirror image of the first end wall 40. A circular opening 90 in the second end wall 42 is centered on the axis 46. A safety tab 92 is formed in the second end wall 42 on the periphery of the opening 90 at a location adjacent to the central wall 34. An access opening 94 in the central wall 34, at a location adjacent to the safety tab 92, provides access to the safety tab, from inside the housing 12, after assembly of the module 10. A similar access opening (not shown) in the central wall 34 at a location adjacent to the first end wall 40 provides access to the safety tab 62, from inside the housing 12, after assembly of the module 10.

An arcuate slot 100 is formed in the second end wall 42 at a location circumferentially opposite from the safety tab 92. A pair of inner mounting tabs 102 and 104 project axially outward from the second end wall near the circumferential ends of the slot 100. An outer mounting tab 106 projects axially inward from the end wall 42 at the circumferential center of the slot 100.

The air bag 14 (FIG. 1) is made from a fabric material, preferably woven nylon. The air bag 14 includes a central portion 110 and two side portions 112 and 114. A pair of circular openings 116 and 118 are formed in the side portions 112 and 114, respectively. The air bag 14 is folded and stored in the housing 12 in a manner described below in detail.

The inflator 16 (FIG. 1) is a known inflator having an elongate cylindrical shape including a central portion 130 and first and second opposite axial end portions 132 and 134. A tubular outer wall of the inflator 16 has a cylindrical outer surface 136 which extends between the end portions 132 and 134 of the inflator. The outer wall of the inflator 16 is preferably made from aluminum. A plurality of fluid outlets 138 in the inflator 16 enable flow of inflation fluid, upon actuation of the inflator, into the chamber 44 in the housing 12 to inflate the air bag 14.

A pair of lead wires 140 on the first end portion 132 of the inflator 16 are connectable with electric circuitry (not shown) of the vehicle. The electric circuitry includes a collision sensor and a source of electric power for actuation of the inflator in a known manner. A pair of orientation studs (not shown) on the second end portion 134 of the inflator 16 are engageable with a fixture (not shown) during assembly of the module 10 to orient the inflator relative to the housing 12.

The plenum tube 18 (FIG. 1) has a cylindrical tubular configuration. Parallel inner and outer cylindrical surfaces 120 and 122 of the plenum tube 18 extend between opposite axial end portions 124 and 126 of the plenum tube. The inner diameter of the plenum tube 18 is selected so that the plenum tube has an interference fit over the inflator 16. The plenum tube 18 is made from a frangible material which upon actuation of the inflator 16 can easily be broken away from a position covering the fluid outlets 138 in the inflator. The plenum tube 18 is preferably made from a single layer of cardboard with a thickness of about 1 mm or less. The plenum tube 18 may alternatively be made from another paper product material or from another type of destructible material.

The first spring member 20 (FIGS. 4–7) is a metal member of the type commonly known as a wave spring or curved spring washer. Washers of this general type are available from Associated Spring Raymond, Barnes Group, Inc., 380 Sciota Street, Corry, Penn. 16407. The first spring member 20 is made of spring steel such as stainless steel or carbon steel which is preferably harder than the material from which the outer wall of the inflator 16 is made.

Figure 4:
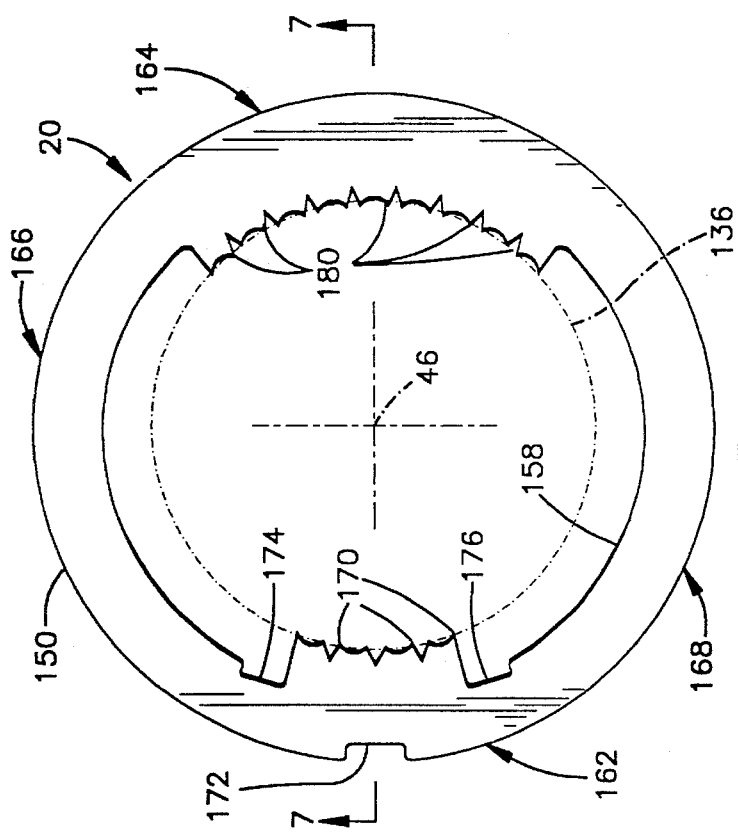
FIG. 4 is a plan view of a spring member which forms a part of the vehicle safety apparatus of FIG. 1 and which is shown in a first condition.
Figure 5:
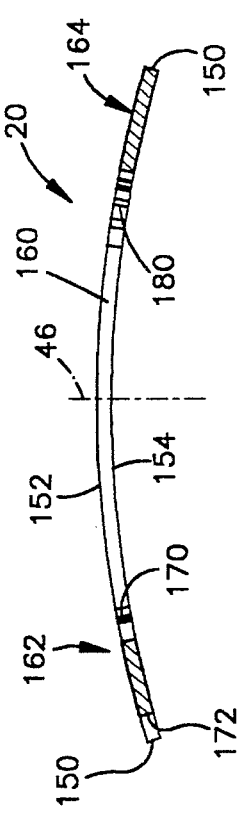
FIG. 5 is a sectional view of the spring member of FIG. 4 taken along line 5—5 of FIG. 4.

The first spring member 20 has an annular configuration with a circular outer periphery 150 and parallel radially extending major side surfaces 152 and 154 (FIG. 5). The annular configuration of the first spring member 20 includes a mounting portion 162 (FIG. 4) and a diametrically opposite engagement portion 164. A pair of arcuate arm portions 166 and 168 of the first spring member 20 extend between and interconnect the mounting portion 162 and the engagement portion 164. Arcuate inner peripheral surfaces 156 and 158 (FIG. 4) of the arm portions 166 and 168, respectively, partially define a central opening 160 in the spring member.

An arcuate series of first teeth 170 are formed on the inner periphery of the mounting portion 162 of the first spring member 20. The first teeth 170 project radially inward toward the axis 46. An outer notch 172 is formed on the outer periphery of the mounting portion 162 of the first spring member 20. A pair of inner notches 174 and 176 are formed on the inner periphery of the first spring member 20 at opposite ends of the series of first teeth 170.

An arcuate series of second teeth 180 are formed on the inner periphery of the engagement portion 164 of the first spring member 20. The second teeth 180 project radially inward toward the axis 46 in a direction generally toward the first teeth 170. The radially inner ends of the second teeth 180 area spaced radially inward from the circular outer periphery 150 of the spring member 20 by the same distance as the radially inner ends of the first teeth 170. The radially inner ends of the first teeth 170 and the radially inner ends of the second teeth 180 define a circular inner diameter of the first spring member 20 indicated schematically by the dashed circle 182. The inner diameter 182 of the first spring member 20, when the first spring member is in a planar condition, is slightly larger than the outer diameter of the inflator 16.

Figure 7:
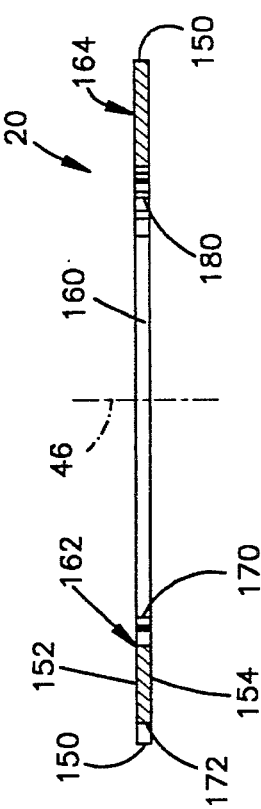
FIG. 7 is a sectional view of the spring member of FIG. 6 taken along Line 7—7 of FIG. 6.

The first spring member 20, when in a free or undeflected state, has a non-planar, arcuate, cross-sectional configuration as best seen in FIG. 7. When the first spring member 20 is in this condition, the major side surfaces 152 and 154 of the first spring member 20 are bowed or curved about an axis (not shown) which is spaced apart from the first spring member. In particular, the arm portions 166 and 168 of the first spring member 20 are bowed so that the mounting portion 162 and engagement portion 164 of the first spring member are curled toward each other slightly. The central opening 160 in the first spring member 20 has a non-circular cross-sectional configuration when taken in a plane perpendicular to the axis 42.

Figure 6:
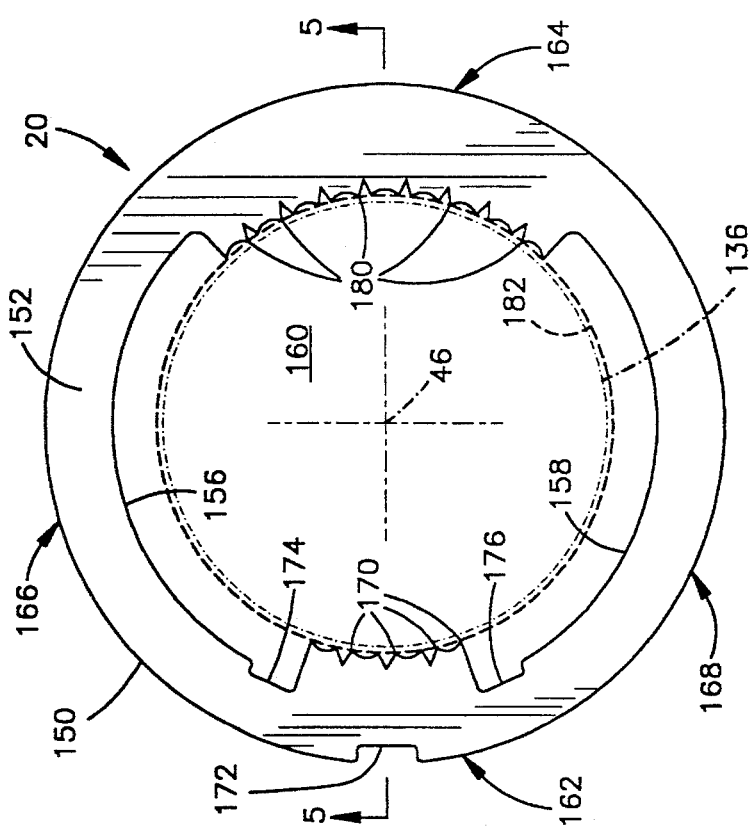
FIG. 6 is a view similar to FIG. 4 and showing the spring member of FIG. 4 in a second condition.

The first spring member 20 is movable, upon the application of force, between the free or undeflected condition shown in FIGS. 6 and 7 and a deflected condition illustrated in FIGS. 4 and 5 in which the major side surfaces 152 and 154 of the first spring member are planar. The distance between the radially inner ends of the first teeth 170 (FIG. 7) and the radially inner ends of the second teeth 180, as measured along a diameter of the first spring member in a plane perpendicular to the axis 46, increases when the first spring member is moved from a non-planar condition as shown in FIGS. 6 and 7 to a planar condition as shown in FIGS. 4 and 5. Conversely, the distance between the inner ends of the first teeth 170 and the inner ends of the second teeth 180 decreases when the first spring member 20 is moved (or springs back) from a planar condition to a non-planar condition. When the first spring member 20 is in a planar condition, the central opening 160 in the first spring member has a circular cross-sectional configuration as taken in a plane perpendicular to the axis 46.

The second spring member 22 (FIG. 1) is identical to the first spring member 20 and has an annular configuration defining a central opening 190. The second spring member 22 includes a mounting portion 192 and a diametrically opposite engagement portion 194. A pair of arcuate arm portions 196 and 198 of the second spring member 22 extend between and interconnect the mounting portion 192 and the engagement portion 194.

An arcuate series of first teeth 200 are formed on the inner periphery of the mounting portion 192 of the second spring member 22. The first teeth 200 project radially inward toward the axis 46. An outer notch 202 is formed on the outer periphery of the mounting portion 192 of the second spring member 22. A pair of inner notches 204 and 206 are formed on the inner periphery of the second spring member 22 at opposite ends of the series of first teeth 200.

An arcuate series of second teeth 210 are formed on the inner periphery of the engagement portion 194 of the second spring member 22 at a location diametrically opposite from the first teeth 200. The second teeth 210 project radially inward toward the axis 46 and in a direction generally toward the first teeth 200. The radially inner ends of the second teeth 210 are spaced radially inward from the circular outer periphery of the spring member 22 by the same distance as the radially inner ends of the first teeth 200. The radially inner ends of the first teeth 200 and the radially inner ends of the second teeth 210 define a circular inner diameter of the second spring member 22 which, when the second spring member is in a planar condition, is slightly larger than the outer diameter of the inflator 16.

The second spring member 22, when in a free or undeflected condition, has a non-planar configuration. In the free or undeflected condition, the radially extending major side surfaces of the second spring member 22 are bowed about (i.e., have an arcuate cross-sectional configuration centered on) an axis (not shown) which is spaced apart from the second spring member. In particular, the arm portions 196 and 198 of the second spring member 22 are bowed so that the mounting portion 192 and engagement portion 194 are curled toward each other slightly. The central opening 190 in the second spring member 22 has a non-circular cross-sectional configuration as taken in a plane perpendicular to the axis 46.

The second spring member 22 is movable, upon the application of force, to a deflected condition (not shown) in which the second spring member is planar in configuration and the major side surfaces of the second spring member are planar. When the second spring member 22 is in the planar condition, the central opening 190 in the second spring member has a circular cross-sectional configuration as taken in a plane perpendicular to the axis 46. The distance between the radially inner ends of the first teeth 200 and the radially inner ends of the second teeth 210 increases when the second spring member 22 is moved from a non-planar condition to a planar condition. Conversely, the distance between the inner ends of the first teeth 200 and the inner ends of the second teeth 210 decreases when the second spring member 22 is moved (or springs back) from a planar condition to a non-planar condition.

To assemble the air bag module 10, the air bag 14 is folded around the plenum tube 18 into the folded condition illustrated in FIG. 1. A loop portion 220 of the central portion 110 of the air bag 14 extends around the cylindrical outer surface 122 of the plenum tube 18. The end portions 124 and 126 of the plenum tube 18 extend through the circular openings 116 and 118, respectively, in the side portions 112 and 114 of the air bag 14. Plastic shrink wrap (not shown) is then applied around the air bag 14 and the plenum tube 18. The subassembly of the air bag 14 and the plenum 18 is thereby secure during movement to the location where the air bag is to be assembled with the inflator 16 and the housing 12. The plenum tube 18 maintains the loop 220 of the air bag 14 open.

The subassembly of the air bag 14 and plenum tube 18 is next inserted into the housing 12 through the opening 52. The circular opening 116 in the side portion 112 of the air bag 14 is aligned with the circular opening 60 in the first end wall 40 of the housing 12. The circular opening 118 in the side portion 114 of the air bag 14 is aligned with the circular opening 90 in the second end wall 42 of the housing 12. The longitudinal central axis of the plenum tube 18 is coincident with the centers of the openings 60 and 90 in the housing 12, and thus with the axis 46 of the air bag module 10.

The first and second spring members 20 and 22 are next connected with the housing 12, either before or after the assembly of the folded air bag 14 with the housing. The mounting portion 162 of the first spring member 20 is inserted into the slot 70 in the first end wall 40 of the housing 12. The mounting portion 162 is disposed in a plane intermediate the plane of the first end wall 42 and the plane of the mounting portion 74 of the first end wall. The outer tab 80 on the first end wall 40 of the housing 12 is received in the outer notch 172 in the first spring member 22. The inner tabs 76 and 78 on the first end wall 40 of the housing 12 are received in the inner notches 176 and 174 in the first spring member 22. The first spring member 22 is thus blocked from rotation about the axis 46 relative to the housing 12. The first spring member 22 is in the free or undeflected condition shown in heavy dot-dash lines in FIG. 2, and the engagement portion 164 of the first spring member is spaced axially outward from the first end wall 40 of the housing 12.

The mounting portion 192 of the second spring member 22 is inserted into the slot 100 in the second end wall 42 of the housing 12. The outer tab 106 on the second end wall 42 of the housing 12 is received in the outer notch 202 in the second spring member 22. The inner tabs 102 and 104 on the second end wall 42 of the housing 12 are received in the inner notches 204 and 206 in the second spring member 22. The second spring member 22 is thus blocked from rotation about the axis 46 relative to the housing 12. The second spring member 22 is in a free or undeflected condition in which the engagement portion 194 of the second spring member is spaced axially outward from the second end wall 42 of the housing 12, as shown in heavy dot-dash lines in FIG. 2.

The first spring member 20 is then moved or deflected to the planar condition shown in light dot-dash lines in FIG. 2. The engagement portion 164 of the first spring member 20 is disposed against the first end wall 40 of the housing 12. With the first spring member in this planar or deflected condition, the central opening 160 in the first spring member 20 has a circular cross-sectional configuration as taken in a plane extending perpendicular to the axis 46. The center of the inner diameter 182 (FIG. 4) in the first spring member 22 is coincident with the axis 46 of the module 10.

The second spring member 22 is also moved or deflected to the planar condition shown in light dot-dash lines in FIG.

2. The engagement portion 194 of the second spring member 22 is disposed against the second end wall 42 of the housing 12. The central opening 190 in the second spring member 22 has a circular cross-sectional configuration as taken in a plane extending perpendicular to the axis 46. The center of the opening 190 of the second spring member 22 is coincident with the center of the circular opening 90 in the second end wall 42 of the housing 12 and thus with the axis 46.

The inflator 16 is next inserted axially through one of the end walls 40 and 42 into the housing 12. The inflator 16 is moved into the open center of the plenum tube 18. The plenum tube 18 holds open the loop portion 220 of the air bag 14 during insertion of the inflator 16. Portions of the inflator 16 move axially through the circular opening 60 in the second end wall 40 of the housing 12 and through the circular opening 90 in the first end wall 42 of the housing. The inflator 16 slips without interference through the central openings 160 and 190 in the spring members 20 and 22, because the inflator is slightly smaller in diameter than the central openings in the first and second spring members when they are flattened into the deflected, planar condition illustrated in light dot-dash lines in FIG. 2.

When the inflator 16 is disposed in the housing 12, the first end portion 132 of the inflator 16 projects axially from the housing 12 through the circular opening 60 in the first end wall 40 of the housing 12. The first end portion 132 of the inflator 16 also extends through the central opening 150 in the first spring member 20. The second end portion 134 of the inflator projects from the housing through the circular opening 90 in the second end wall 42 of the housing. The second end portion 134 of the inflator 16 also extends through the central opening 190 in the second spring member 22. The longitudinal central axis of the inflator 16 is coincident with the axis 46 of the air bag module 10. The inflator 16 is concentric with the circular openings 60 and 90 in the housing 12, and with the central openings 160 and 190 in the spring members 20 and 22.

After the inflator 16 is positioned in the housing 12, the spring members 20 and 22 are released from the deflected condition to engage the inflator and secure the inflator in position relative to the housing. When the first spring member 20 is released, the engagement portion 164 of the first spring member 20 springs outward from the end wall 40 of the housing 12 in a direction toward the free or undeflected condition which is shown in heavy dot-dash lines in FIG. 2. However, the first spring member 22 can not assume the free or undeflected condition because the engagement portion 164 of the spring member engages the inflator 16 at an assembled condition as shown in solid lines in FIG. 2. This assembled condition is intermediate the undeflected condition and the deflected condition shown in FIG. 2.

When the first spring member 20 is in the assembled condition, the engagement portion 164 of the first spring member engages the cylindrical outer surface 136 of the inflator 16. The second teeth 180 on the engagement portion 164 of the first spring member 22 dig into the outer surface 136 of the first end portion 132 of the inflator 16. Because the mounting portion 162 of the first spring member 20 is fixed in position on the housing 12, the center of the opening 160 in the first spring member, and the engagement portion 164, move in a direction toward the mounting portion of the first spring member. The engagement portion 164 of the first spring member 22 pulls the inflator 16 radially into engagement with the first teeth 170 on the mounting portion 162 of the first spring member. The first teeth 170 on the mounting portion 162 of the first spring member 22 dig into the outer surface 136 of the inflator 16.

The engagement of the second spring member 22 with the second end portion 134 of the inflator 16 is similar to the engagement of the first spring member 20 with the first end portion 132 of the inflator. When the second spring member 22 is released, the engagement portion 194 of the second spring member moves relative to the mounting portion 192, springing away from the second end wall 42 of the housing 12. The second spring member moves toward the free or undeflected condition shown in heavy dot-dash lines in FIG. 2. The second spring member 22 assumes an assembled condition as shown in solid lines in FIG. 2, disposed intermediate the free or undeflected condition and the planar condition.

The engagement portion 194 of the second spring member 22 engages the cylindrical outer surface 136 of the second end portion 134 of the inflator 16. The second teeth 210 on the engagement portion 194 of the second spring member 22 dig into the inflator 16. Because the mounting portion 192 of the second spring member 22 is fixed on the housing 12, the center of the opening 190 in the second spring member, and the engagement portion 194, move in a direction toward the mounting portion of the second spring member. The inflator 16 is pulled radially into engagement with the first teeth 200 on the mounting portion 192 of the second spring member. The first teeth 200 dig into the outer wall of the inflator 16.

Each one of the spring members 20 and 22 exerts an axially outwardly directed spring force on a respective end portion 132 and 134 of the inflator 16. These spring forces resist movement of the spring members 20 and 22 out of the assembled condition, in a direction away from the free condition and toward the deflected, planar condition.

The first spring member 20 blocks movement of the central portion 130 of the inflator 16 in a direction out of the housing 12 through the first end wall 40 of the housing. This is because the first end portion 132 of the inflator 16 is in engagement with the teeth 170 and 190 on the first spring member 20. The first spring member 20, while in the assembled condition, can move no farther toward its free or undeflected condition. Therefore, the first end portion 132 of the inflator 16 can move no farther axially out of the housing 12.

The second spring member 22 blocks movement of the central portion 130 of the inflator 16 out of the housing 12 through the second end wall 42 of the housing. This is because the second end portion 134 of the inflator 16 is in engagement with the teeth 200 and 210 on the second spring member 22. The second spring member 22, while in the assembled position, can move no farther toward its free position. Therefore, the second end portion 134 of the inflator 16 can not move farther axially out of the housing 12.

The cylindrical outer surface 136 of the central portion 130 of the inflator 16 is in abutting engagement, i.e., an interference fit, with the cylindrical inner surface 120 of the plenum tube 18. Therefore, after the inflator 16 is secured to the housing 12, the inflator 16 holds the plenum tube 18 in position relative to the housing. The inflator 16 and the plenum tube 18 block movement of the loop portion 220 of the air bag 14 out of the housing 12 thorough the opening 52.

After assembly of the air bag module 10, a suitable tool (not shown) is inserted through the access opening 94 (FIGS. 1 and 2) in the central wall 34 of the housing 12. The safety tab 92 is bent outward from the plane of the second end wall 42 of the housing 12 to the position shown in FIG. 2. The safety tab 92 blocks movement of the second spring member 22 to a planar deflected position (not shown in FIG.

2) against the second end wall 42 of the housing 12. The bent safety tab 92 prevents movement of the second spring member 22 to a condition in which the inflator 16 could be removed or dislodged through the central opening 190 in the second spring member. In a similar manner, the safety tab 62 in the first end wall 40 of the housing 12 is also bent out of the plane of the first end wall, in a manner not shown, to prevent movement of the first spring member 20 to a condition in which the inflator 16 could be removed or dislodged through the central opening 160 in the first spring member.

In the event of vehicle deceleration such as occurs in a vehicle collision, the collision sensor (not shown) of the vehicle causes an electric current to flow through the lead wires 140 of the inflator 16. The inflator 16 is actuated and directs inflation fluid through the fluid outlets 138 into the chamber 44 in the housing 12. The inflation fluid flows into the air bag 14 to move the air bag from the folded and stored condition illustrated in FIG. 1 to an unfolded and inflated condition (not shown) to restrain a vehicle occupant.

The inflation fluid which flows through the fluid outlets 138 in the inflator 16 is moving rapidly. The inflation fluid causes the portion 18a (FIG. 2) of the plenum tube 18 which is disposed intermediate the inflator 16 and the opening 52 of the housing 12 to be blown away from the fluid outlets 138, to enable passage of inflation fluid into the air bag 14. The portion 18b of the plenum tube 18 which is disposed intermediate the inflator 16 and the loop portion 220 of the air bag 14 remains in position overlying the inflator. This remaining portion of the plenum tube 18 which is to thermally insulate portions of the air bag 14 including the loop portion 220 from the inflator 16. The plenum tube 18 does not interfere with inflation of the air bag 14.

From the above description of the invention, those skilled in the art will perceive improvements, changes and modifications in the invention. For example, the plenum tube may alternatively be made from a non-destructible material such as metal which is not destroyed upon actuation of the inflator. A non-destructible plenum tube would have perforations to enable inflation fluid to flow from the inflator into the air bag. The housing 12, which supports the other parts of the module 10, could be defined by portions of the vehicle instrument panel, rather than being a separate element. Such improvements, changes and modifications within the skill of the art are intended to be covered by the appended claims.

Having described the invention, we claim:

1. A vehicle safety apparatus comprising:

a housing;

an inflatable vehicle occupant restraint connected with said housing;

an inflation fluid source in said housing for supplying inflation fluid to said inflatable restraint, said inflation fluid source having a first end portion projecting from said housing; and means for connecting said inflation fluid source with said housing, said connecting means comprising a spring member connected with said housing and having an annular configuration defining a central opening in said spring member, said first end portion of said inflation fluid source extending through said central opening in said spring member, said spring member including a portion having a first condition in which said first end portion of said inflation fluid source is movable through said central opening of said spring member and a second condition in which said first end portion of said inflation fluid source is not movable through said central opening of said spring member;

said spring member having a substantially planar configuration when said portion of said spring member is in the first condition and having an arcuate non-planar configuration when said portion of said spring member is in the second condition.

2. A vehicle safety apparatus as set forth in claim 1 wherein said spring member is movable relative to said housing between a deflected condition and an undeflected condition, said spring member being in the deflected condition when said portion of said spring member is in the first condition, said spring member moving from the deflected condition toward the undeflected condition when said portion of said spring member is in the second condition.

3. A vehicle safety apparatus as set forth in claim 1 wherein said inflation fluid source has an elongate cylindrical configuration, said first end portion of said inflation fluid source having a cylindrical outer surface, said central opening in said spring member having a generally circular configuration with a diameter selected to receive said first end portion of said inflation fluid source freely through said central opening when said portion of said spring member is in the first condition.

4. A vehicle safety apparatus comprising:

a housing;

an inflatable vehicle occupant restraint connected with said housing;

an inflation fluid source in said housing for supplying inflation fluid to said inflatable restraint, said inflation fluid source having a first end portion projecting from said housing; and means for connecting said inflation fluid source with said housing, said connecting means comprising a spring member connected with said housing and having an annular configuration defining a central opening in said spring member, said first end portion of said inflation fluid source extending through said central opening in said spring member, said spring member including a portion having a first condition in which said first end portion of said inflation fluid source is movable through said central opening of said spring member and a second condition in which said first end portion of said inflation fluid source is not movable through said central opening of said spring member;

said inflation fluid source having a longitudinal central axis, said spring member being generally planar and extending perpendicular to said axis when said portion of said spring member is in the first condition;

said central opening in said spring member having a circular cross-sectional configuration as taken in a plane perpendicular to said axis when said portion of said spring member is in the first condition;

said central opening in said spring member having a non-circular cross-sectional configuration as taken in a plane perpendicular to said axis when said portion of said spring member is in the second condition.

5. A vehicle safety apparatus as set forth in claim 4 wherein said first end portion of said inflation fluid source has a cylindrical outer surface with a diameter which is less than the diameter of said central opening in said spring member when said portion of said spring member is in the first condition.

6. A vehicle safety apparatus as set forth in claim 5 wherein said spring member has a mounting part fixed in position relative to said housing, said portion of said spring member including two arm parts extending from opposite ends of said mounting part and an engagement part interconnecting said arm parts and disposed opposite said mounting part in said annular configuration of said spring member.

7. A vehicle safety apparatus as set forth in claim 1 wherein said inflation fluid source has a second end portion opposite to said first end portion and projecting from said housing at a location spaced apart from said first end portion;

said means for connecting said inflation fluid source with said housing further comprising a second spring member connected with said housing at a location spaced apart from said first spring member, said second spring member having an annular configuration defining a central opening in said second spring member, said second end portion of said inflation fluid source extending through said central opening in said second spring member, said second spring member including a portion having a first condition in which said second end portion of said inflation fluid source is movable through said central opening of said second spring member and a second condition in which said second end portion of said inflation fluid source is not movable through said central opening of said second spring member.

8. A vehicle safety apparatus comprising:

a housing;

an inflatable vehicle occupant restraint connected with said housing;

an inflation fluid source in said housing for supplying inflation fluid to said inflatable restraint, said inflation fluid source having a first end portion projecting from said housing; and means for connecting said inflation fluid source with said housing, said connecting means comprising a spring member connected with said housing and having an annular configuration defining a central opening in said spring member, said first end portion of said inflation fluid source extending through said central opening in said spring member, said spring member including a portion having a first condition in which said first end portion of said inflation fluid source is movable through said central opening of said spring member and a second condition in which said first end portion of said inflation fluid source is not movable through said central opening of said spring member;

said housing including a wall having surfaces defining a slot in said wall, said spring member having a mounting portion received in said slot and fixed in position relative to said housing, said portion of said spring member being movable relative to said mounting portion of said spring member.

9. A vehicle safety apparatus as set forth in claim 8 wherein said wall includes surfaces defining a plurality of tabs spaced around an outer periphery of said slot, said mounting portion of said spring member having surfaces defining a plurality of notches in said spring member, said tabs on said housing wall being received in said notches in said spring member to block movement of said mounting portion of said spring member relative to said housing.

10. A vehicle safety apparatus as set forth in claim 1 further comprising a tube extending through said inflatable restraint and defining a chamber in said inflatable restraint through which said inflation fluid source is extensible during assembly of said vehicle safety apparatus, said inflation fluid source having a portion extending through said tube and through said chamber in said inflatable restraint, said inflatable restraint having a portion extending around said inflation fluid source and around said tube.

11. A vehicle safety apparatus comprising:

a housing;

an inflatable vehicle occupant restraint connected with said housing;

an inflation fluid source in said housing for supplying inflation fluid to said inflatable restraint, said inflation fluid source having a first end portion projecting from a first end of said housing and having a second end portion projecting from a second end of said housing; and means for connecting said inflation fluid source with said housing;

said means for connecting said inflation fluid source with said housing comprising a first spring member connected with said first end of said housing and having an annular configuration defining a central opening in said first spring member, said first spring member having a deflected condition wherein said first spring member has a substantially planar configuration and said first spring member having an undeflected condition wherein said first spring member has an arcuate non-planar configuration, said first end portion of said inflation fluid source extending through said central opening in said first spring member when said first spring member is in said deflected condition, said first spring member blocking movement of said first end portion of said inflation fluid source relative to said first end of said housing when said first spring member is in said undeflected condition;

said means for connecting said inflation fluid source with said housing further comprising a second spring member connected with said second end of said housing and having an annular configuration defining a central opening in said second spring member, said second spring member having a deflected condition wherein said second spring member has a substantially planar configuration and said second spring member having an undeflected condition wherein said second spring member has an arcuate non-planar configuration, said second end portion of said inflation fluid source extending through said central opening in said second spring member when said second spring member is in said deflected condition, said second spring member blocking movement of said second end portion of said inflation fluid source relative to said second end of said housing when said second spring member in said undeflected condition.

12. A vehicle safety apparatus comprising:

a housing;

an inflatable vehicle occupant restraint folded and stored in said housing;

an inflation fluid source in said housing for supplying inflation fluid to said inflatable restraint;

means for connecting said inflation fluid source with said housing; and a cylindrical tube extending through said inflatable restraint and defining a chamber in said inflatable restraint, said tube being made from a frangible material which is easily broken away from a position covering fluid outlets of said inflation fluid source upon actuation of said inflation fluid source;

said inflation fluid source having a portion extending through said tube and through said chamber in said inflatable restraint.

13. A vehicle safety apparatus as set forth in claim 12 wherein said tube is made from cardboard.

14. A vehicle safety apparatus as set forth in claim 12 wherein said inflatable vehicle occupant restraint includes a first side portion having an opening through which a first end portion of said inflation fluid source projects, a second side portion having an opening through which a second end portion of said inflation fluid source projects, and a central portion extending between and interconnecting said first and second side portions, said central portion including a loop portion extending around said tube.

15. A vehicle safety apparatus comprising:

a housing;

an inflatable vehicle occupant restraint folded and stored in said housing;

an inflation fluid source in said housing for supplying inflation fluid to said inflatable restraint; and plenum means for maintaining a chamber in said inflatable restraint through which said inflation fluid source is extensible during assembly of said vehicle safety apparatus, said inflatable restraint having a portion extending around said inflation fluid source and around said plenum means, said plenum means being made from a frangible material which is easily broken away from a position covering fluid outlets of said inflation fluid source upon actuation of said inflation fluid source.

16. A vehicle safety apparatus as set forth in claim 15 wherein said plenum means comprises a cylindrical tube extending through said inflatable restraint and defining said chamber in said inflatable restraint, said inflation fluid source having a portion extending through said tube and through said chamber in said inflatable restraint after assembly of said vehicle safety apparatus.

17. A vehicle safety apparatus as set forth in claim 16 wherein said cylindrical tube is made from cardboard.

18. A vehicle safety apparatus as set forth in claim 16 wherein said inflation fluid source has a cylindrical outer surface in abutting engagement with a cylindrical inner surface of said tube.

\* \* \* \* \*